United States Patent [19]
Larson

[11] 3,855,028

[45] Dec. 17, 1974

[54] METHOD OF FABRICATING STRUCTURES

[76] Inventor: Donald J. Larson, 527 W. Algonquin Rd., Arlington Heights, Ill. 60005

[22] Filed: Nov. 8, 1972

[21] Appl. No.: 304,628

[52] U.S. Cl.............. 156/79, 52/309, 52/727, 138/145, 138/DIG. 9, 161/160, 264/45
[58] Field of Search...... B32b/5/18; 156/79; 264/45; 161/159, 160, 161; 52/309, 727; 138/DIG. 9, 145; 252/62

[56] References Cited
UNITED STATES PATENTS

| | | | |
|---|---|---|---|
| 3,293,094 | 12/1966 | Nairn et al. | 156/79 |
| 3,399,107 | 8/1968 | Biskup et al. | 156/79 X |
| 3,451,696 | 6/1969 | Hagelin et al. | 156/79 X |

Primary Examiner—Edward G. Whitby
Attorney, Agent, or Firm—Hume, Clement, Brinks, Willian, Olds & Cook Ltd.

[57] ABSTRACT

A method of fabricating insulated and insulated/sound deadened structures such as duct-work, pipe and housings and the like from sheet and strip material. A coating of a foamable plastic is applied to at least one surface of a sheet or strip. The sheet or strip is cured by heating to solidify and bond the plastic but not expand it. The sheet or strip is then formed by conventional forming techniques. Subsequently, further heating causes expansion of the cured plastic.

8 Claims, 4 Drawing Figures

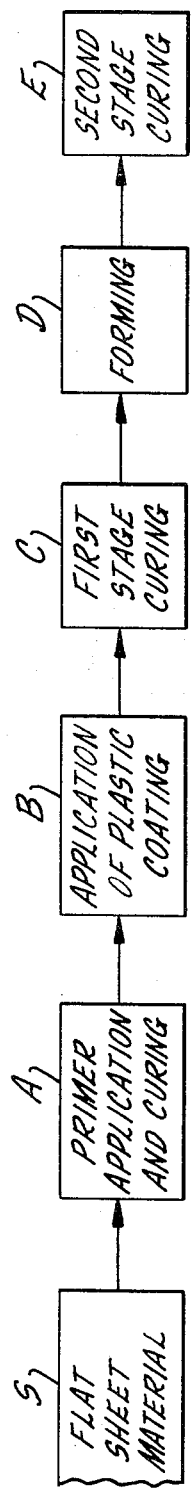
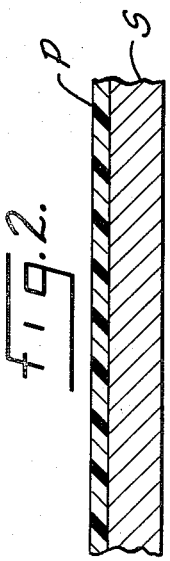
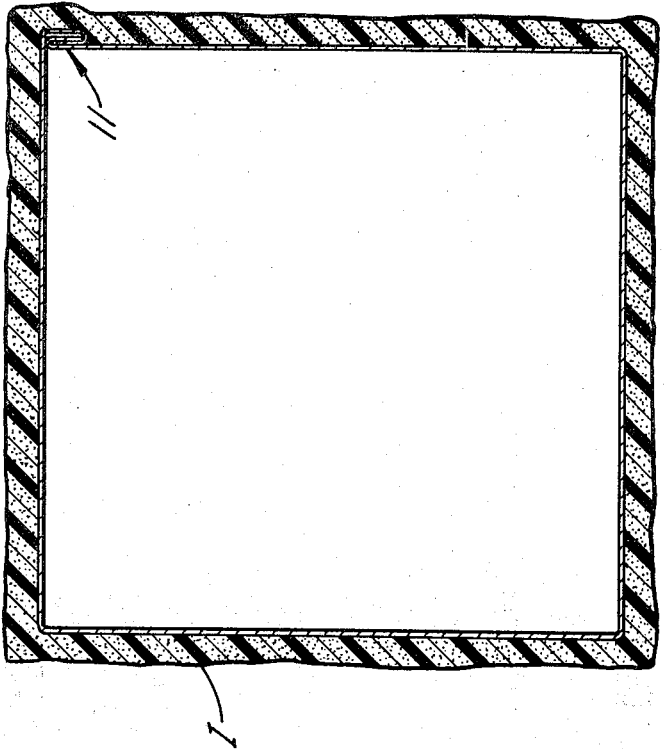
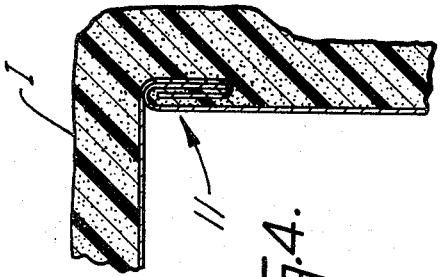

METHOD OF FABRICATING STRUCTURES

FIELD OF THE INVENTION

This invention relates in general to the fabrication of insulated and sound deadened structures such as duct-work, sheet metal pipe and housings and the like. It deals more particularly with a method of fabricating such structures.

BACKGROUND OF THE INVENTIONN

It is frequently desirable that heating and cooling duct-work, for example, be insulated. Sound deadening is also frequently desirable. The same is true of sheet metal pipe and housings in various of their normal applications. Historically, the insulation was of the fiber type, either wrapped around or bonded to the sheet material, and was applied after the structures were formed.

In recent years foamed plastic insulation has come into prominence. One approach is to apply a thin coat of a liquid plastic such as vinyl-chloride polymer containing a foaming agent to the structure after it is fabricated and assembled. The plastic is then foamed and cured by heating in a conventional manner. The foamed plastic acts as insulation and may act as a sound deadener for the structure. Another approach is to spray plastic foamed insulation directly on the structure.

SUMMARY OF THE INVENTION

A primary object of the present invention is to provide a new and improved method of fabricating insulated structures such as duct-work, pipe and housings and the like from sheet or strip material. Another object is to provide a new method of sound deadening. Another object is to provide a method of fabricating such structures wherein the insulation and sound deadener comprises an expanded plastic bonded to the sheet or strip material. Still another object is to provide a method of fabricating insulated and sound deadened structures of the aforedescribed character wherein a film of plastic is bonded to the sheet or strip prior to the structure being formed. Yet another object is to provide a method of fabricating structures insulated and sound deadened with an expanded plastic wherein airtight, insulated joints are formed in the structure.

The foregoing and other objects are realized in accord with the invention by providing a method of fabricating structures from sheet or strip material wherein the sheet or strip to be fabricated, low carbon steel, for example, is first cleaned and coated with a primer. The primer, preferrably a thermosetting phenolic resin in a volatile organic solvent is cured by heating it in a well-known manner. Then a coating of a foamable polyvinyl chloride plastic is applied to one or both surfaces of the sheet or strip. The sheet or strip is cured at 350°F. for 60 seconds in a first curing operation. The first curing operation solidifies the plastic material and bonds it to the sheet or strip but does not produce any noticeable expansion of the plastic.

The sheet or strip is then cut and formed in standard forming machines to shape the components for duct-work, pipe or box-like container structures or the like. The structure is then assembled. With duct-work, for example, joints are formed and made between adjacent edges of the components.

The duct-work, for example, then is heated in an oven for approximately three minutes at 395°F. In this process, the plastic film undergoes a second stage curing and expands to approximately 40 to 1,000 times its original thickness, depending upon the thickness of the originally applied film. The expanded plastic layer constitutes excellent insulation which has been instantly formed over one entire surface of the structure. Expanded plastic in the area of the joints creates air-tight seals in the duct-work.

By a modified treatment of the duct-work, the layer is made into a second deadening medium also. Heating the duct-work for a longer period of time opens the expanded cells at the insulation surface and forms a sound deadening maze of open cell walls.

The method permits application of a plastic coating to sheet or strip material before it is formed. The material may be sheet or strip steel, as has been described, or any other sheet material to which plastic will bond and which forming operations may be applied to. Conventional forming equipment can be effectively used because the plastic coating is still very thin after first stage curing. The second stage curing then creates a thick insulation layer (and sound deadening, if desirable) and seals the joints.

BRIEF DESCRIPTION OF THE DRAWING

The invention, comprising the method of fabricating insulated structures, is illustrated more or less diagrammatically in the accompanying drawing, in which:

FIG. 1 is a block diagram illustration of the steps in the method embodying freatures of the present invention;

FIG. 2 is a secitonal view taken through a piece of plastic coated sheet steel after the first curing operation in the method;

FIG. 3 is a sectional view taken through a heating duct after forming and completion of the second curing operation in the method; and FIG. 4 is an enlarged sectional view taken through the joint illustrated in the duct in FIG. 3.

DESCRIPTION OF THE PREFERRED EMBODIMENT

Referring now to the drawing, the method of the invention is illustrated in FIG. 1 in block diagram form in its various steps, identified as A–E. The method is described in terms of the fabrication of a section of sheet metal duct 10 (see FIG. 3) from a flat sheet S of 26 gauge low carbon steel.

The flat sheet S of steel is cleaned and then preferrably electro-chemically treated by passing it through a tank containing a dilute solution of sodium dicromate and phosphoric acid. A stable chromate foundation coating is formed on both sides of the sheet of electrolysis.

In the first step of the invention method, represented by block A, the sheet S is then primed on one or both sides with a conventional primer. Such a primer might comprise a mixture of a vinyl polymer and a thermosetting phenolic resin in a combination of ketones and aromatic hydrocarbons. The ingredients vary somewhat depending upon the primer used, but any number of them are suitable. The primed sheet S is cured by heating for 60 seconds at 350°F. This casues the primer solvent which has not yet evaporated to vaporize and a film of cured adhesive remains on the sheet.

In the second step of the method, represented by block B, the primed sheet S is coated on one or both sides with a thin film of plastic of uniform thickness. The plastic is a heat curable synthetic resin, polyvinyl chloride, with a plasticizer and a dilutant added. In the method of the present invention, the plastic used is known as Black 2S Foam, No. 7061–903, manufactured by Universal Chemical Company, Elkgrove Village, Ill.

In the present illustrated method embodiment of the invention, a plastic film 0.010 inches thick is applied to the primed side of the steel sheet S by a roller, painting or spraying method. After being coated, the sheet S is fed into an oven where the next step of the method embodying the invention is formed, represented by block C in FIG. 1.

The oven preferrably comprises an elongated chamber through which a conveyor passes and in which heating means such as infra-red lamps or radiators are provided. In the oven, the coated sheet is subjected to an atomsphere maintained at 350°F. for a period of sixty seconds, after which the sheet is removed. During this 60 second period, the plastic cures to the extent that it hardens and bonds to the surface of the steel sheet S through the medium of the primer. Referring to FIG. 2 of the drawing, the sheet S is shown at this stage of the method with the film of plastic P bonded to it. The steel sheet S with its bonded film of plastic P is allowed to cool. The film P at this stage is still 0.010 inches thick.

In the next step of the method, represented in FIG. 1 by the box D, the sheet S with its 0.010 inch film P of plastic is formed by conventional bending techniques into a rectangular cross-section structure, as seen in FIG. 3. Suitable joint defining bends are formed along corresponding edges of the sheet S to estabish the longitudinally extending joint 11 of the duct 10. The structure is assembled and a lap joint 11 completed.

In the final step of the method embodying features of the invention, represented by the box E, second stage curing of the plastic film P on the sheet S is carried out. This second stage curing is accomplished in the aforedescribed oven at a temperature of 395°F. However, the duct 10 is held in the oven for 3 minutes, or approximately 3 times as long as the first stage curing. For approximately 2 to 2½ minutes, no substantial expansion occurs, after which the film P expands or foams rapidly.

The second stage curing causes expansion or foaming of the plastic film P to approximatley forty times its original thickness, or 0.400 inches. Thus, insulation I almost one-half inch thick is formed over the entire outside surface of the duct 10. The expansion of the plastic film P in the area of the joint 11 establishes an air-tight seal at the longitudinally extending joint. This seal is illustrated in detail in FIG. 4.

If sound deadening as well as insulation is desirable, the method involves second stage curing for in excess of three minutes until the cells of the expanded plastic insulation I open at the insulation surface. The open cells create a sound deadening surface maze of pockmarked configuration.

The method of the invention has been described in terms of the fabrication of insulated and sound deadened duct-work. It is equally applicable to the fabrication of other sheet material structures where foamed plastic insulation or insulation/sound deadening is desirable, however. The method makes fabrication of any such structures, including equipment housings, pipe, and duct-work both simple and inexpensive.

The method of the invention has also been described in terms of applying a film 0.010 inches thick to sheet material and expanding it 40 times to a coating almost one-half inch thick. In practice, if an insulation coating of much greater thickness is desirable, the thickness of initial plastic film need only be increased.

As has been pointed out, the method also encompasses application of a plastic layer to both sides of a sheet before forming it. In practice, this might be done when spiral pipe having inside sound deadening capability is desired.

While several embodiments described herein are at present considered to be preferred, it is understood that various modifications and improvements may be made therein.

What is desired to be claimed and secured by Letters Patent of the United States is:

1. A method of fabricating insulated structures such as duct work, pipe and housings and the like from sheet or strip material, comprising the steps of:
   a. applying a thin film of expandable plastic to at least one side of a sheet or strip of material,
   b. said plastic comprising a foamable vinyl chloride polymer which can be at least partially cured without noticeable expansion when heated to a temperature not exceeding 350°F for 60 seconds or less,
   c. heating the strip or sheet of material in a first stage curing operation for approximately 60 seconds to at least partially cure the plastic and cause it to be bonded to the sheet or strip but insuffficient to cause noticeable expansion of the plastic,
   d. forming the sheet or strip of material into a desired structure, and
   e. heating the structure in a second stage curing operation for a predetermined period of time sufficient to cause said plastic film to expand at least several times in thickness.

2. The method of claim 1 further characterized by and including the step of:
   a. in said second stage curing operation heating said structure to approximately 395°F.,
   b. said predetermined period of time in said second stage curing operation being at least 3 minutes.

3. The method of claim 2 further characterized by and including the step of:
   a. extending said second stage curing operation for more than 3 minutes until sufficient outer surface cells on the insulation layer open to form a sound deadening, irregular surface.

4. A method of fabricating insulated duct work from sheet or strip material, comprising the steps of:
   a. applying a thin film of plastic to at least one side of a substantially flat sheet or strip of metal,
   b. said plastic comprising a foamable vinyl chloride polymer which may be at least partially cured without noticeable expansion when heated to a temperature not exceeding 350° for 60 seconds or less,
   c. heating the strip or sheet of metal in a first stage curing operation for approximately 60 seconds to at least partially cure the plastic and cause it to be bonded to the metal but insufficient to cause noticeable expansion of the plastic, d. forming the sheet or strip of metal into duct work with said one side out and joining adjacent edges of the metal in lap joint means, and e. heating the fabricated duct work in a second stage curing operation for a predetermined period of time sufficient to cause said film to expand at least 40 times its original thickness except where it is restricted in said lap joint means whereby relatively thick insulation is formed over the entire outside of said duct work and an airtight seal is formed by expansion of said plastic in said lap joint means.

5. The method of claim 4 further characterized by and including the step of:

a. in said second stage curing operation heating said structure to approximately 395°F., b. said predetermined period of time in said second stage curing operation beind at least 3 minutes for an expansion of at least 40 times.

6. A method of fabricating a plastic coated metal structure, comprising the steps of:

a. applying a thin film of expandable plastic to a surface of a strip or sheet of a metal member, b. heating the metal member in a first stage curing operation for a predetermined period of time sufficient to at least partially cure the plastic and cause it to be bonded to said sheet or strip but insufficient to cause noticeable expansion of the plastic, c. forming said sheet or strip of metal into a desired structure, and d. heating the structure in a second stage curing operation for a predetermined period of time sufficient to cause said plastic film to expand at least several times in thickness.

7. The method of claim 6 further characterized by and including the step of:

a. heating the structure in a second stage curing operation for a time sufficient to cause expansion of said film and opening of cellular structure on the outer surface of the film whereby a sound deadening surface is formed.

8. A method of fabricating insulated structures such as duct work, pipe and housings and the like from sheet or strip material, comprising the steps of:

a. applying a thin film of expandable plastic to at least one side of an unformed sheet or strip of material, b. heating the strip or sheet of material in a first stage curing operation for a predetermined period of time sufficient to at least partially cure the plastic and cause it to be bonded to the sheet or strip but insufficient to cause noticeable expansion of the plastic, c. forming the sheet or strip of material into the desired structure, and d. heating the structure in a second stage curing operation for a predetermined period of time sufficient to cause said plastic film to expand at least several times in thickness.

* * * * *

UNITED STATES PATENT OFFICE
CERTIFICATE OF CORRECTION

Patent No. 3,855,028            Dated December 17, 1974

Inventor(s)    DONALD J. LARSON

It is certified that error appears in the above-identified patent and that said Letters Patent are hereby corrected as shown below:

Column 2, line 12, change "second" to --sound--.
            Line 31, change "freatures" to -- features --.

Column 5, line 17, change "beind" to --being--.

Signed and sealed this 29th day of April 1975.

(SEAL)
Attest:

RUTH C. MASON
Attesting Officer

C. MARSHALL DANN
Commissioner of Patents
and Trademarks